(12) United States Patent
Badstue et al.

(10) Patent No.: US 8,256,447 B2
(45) Date of Patent: Sep. 4, 2012

(54) PRESSURE RELIEF DEVICE FOR AN INFLATABLE TIRE

(75) Inventors: Søren Badstue, Klampenborg (DK); Amir Shahar, Dragør (DK)

(73) Assignee: Opfinderfabrikken APS, Klampenborg (DK)

( * ) Notice: Subject to any disclaimer, the term of this patent is extended or adjusted under 35 U.S.C. 154(b) by 686 days.

(21) Appl. No.: 12/227,410

(22) PCT Filed: May 24, 2007

(86) PCT No.: PCT/DK2007/000246
§ 371 (c)(1),
(2), (4) Date: Mar. 11, 2009

(87) PCT Pub. No.: WO2007/134611
PCT Pub. Date: Nov. 29, 2007

(65) Prior Publication Data
US 2009/0308462 A1    Dec. 17, 2009

Related U.S. Application Data

(60) Provisional application No. 60/802,770, filed on May 24, 2006.

(30) Foreign Application Priority Data
May 24, 2006    (EP) ..................................... 06010893

(51) Int. Cl.
*F16K 15/20*    (2006.01)
(52) U.S. Cl. .......................... 137/226; 137/228; 137/223
(58) Field of Classification Search ................... 137/224, 137/226, 228
See application file for complete search history.

(56) References Cited

U.S. PATENT DOCUMENTS

| | | | | |
|---|---|---|---|---|
| 1,114,796 | A * | 10/1914 | Nickel | 137/226 |
| 1,481,018 | A * | 1/1924 | Littman | 137/223 |
| 1,735,918 | A * | 11/1929 | Dobil | 15/148 |
| 3,315,695 | A * | 4/1967 | Boyer | 137/232 |
| 3,830,249 | A | 8/1974 | Fleenor et al. | |
| 4,445,527 | A * | 5/1984 | Leimbach | 137/226 |
| 4,660,590 | A | 4/1987 | Sanchez | |
| 5,778,923 | A * | 7/1998 | Marston | 137/226 |
| 6,105,600 | A * | 8/2000 | Wang | 137/231 |
| 6,125,694 | A | 10/2000 | Bledsoe | |
| 6,631,729 | B2 * | 10/2003 | Van der Blom | 137/231 |
| 6,672,328 | B2 * | 1/2004 | Colussi et al. | 137/102 |
| 7,021,326 | B2 * | 4/2006 | Rogier | 137/226 |
| 7,032,611 | B1 * | 4/2006 | Sheng | 137/225 |

FOREIGN PATENT DOCUMENTS

| | | |
|---|---|---|
| WO | WO 01/16513 | 3/2000 |
| WO | WO 2005/042277 | 5/2005 |

* cited by examiner

*Primary Examiner* — Eric Keasel
*Assistant Examiner* — R. K. Arundale
(74) *Attorney, Agent, or Firm* — Harness, Dickey & Pierce, P.L.C.

(57) ABSTRACT

A pressure relief device (100) for an inflatable tire comprises a body (102) having a chamber (116) therein and pressure relief mechanism for releasing air when the air pressure in the chamber exceeds a first predetermined pressure level. A conduit (108; 208) inter-connects an air inlet (110; 210) with an air outlet (112; 212). The conduit (108; 208) is provided in a pin (104; 204) arranged to slide axially in a passageway (106) in the body, the pin (104; 204) extending from the air inlet (110; 210) to the air outlet (112; 212) and being slidable between a first position in which it cannot release a stem of the tire, and a second position, in which it can release the stem.

10 Claims, 3 Drawing Sheets

PRESSURE RELIEF DEVICE FOR AN INFLATABLE TIRE

CROSS-REFERENCE TO RELATED APPLICATIONS

This application is a National Phase entry of PCT Application No. PCT/DK2007/000246, filed on May 24, 2007, which claims priority under 35 U.S.C. §119(e), 120 and 365 (c) to European Patent Application No. 06010893.3, filed on May 24, 2006, in the European Intellectual Property Office, and also claims priority to U.S. Provisional Application No. 60/802,770, filed on May 24, 2006, in the U.S. Patent and Trademark Office.

TECHNICAL FIELD

The present invention relates to a pressure relief device for an inflatable tire, in particular a vehicular tire. The device is intended to release air from the tire when the pressure in the tire exceeds a certain threshold value or to prevent excess air from being forced into the tire during inflation thereof.

BACKGROUND OF THE INVENTION

Various pressure relief devices for inflatable tires have been proposed in the prior art. U.S. Pat. No. 3,830,249 discloses a device in which a pressure relief ball is maintained in a seated position by a force applied by a compression spring until the air pressure within the tire exceeds a set pressure. When the set pressure has been exceeded, the pressure relief ball is unseated from the body, and surplus air escapes from the tire via the pressure relief device.

U.S. Pat. No. 4,660,590 is concerned with an inflation pressure regulator with a substantially friction-free flexing seal arrangement within a housing of the regulator which bypasses the tire when the pressure within the tire reaches a predetermined level. A sealing section of a flexure member is normally urged into sealing contact with a seat surface owing to the force exerted against the flexure member by a spring/ring combination. When the tire has been inflated to the pressure rating of the regulator, the pressure in a first chamber in the housing will exert sufficient force against the upper face of the flexure member to cause a flexing in a portion thereof and a consequential movement of the sealing section away from the seat surface, allowing air to escape via an exhaust aperture.

A further device is known from U.S. Pat. No. 6,125,694, which discloses an audibly reporting pressure-relief, automatic tire assembly for use in interaction with preexisting valve core stems on a tire.

WO 2005/042277 discloses a pressure relief device comprising a ring-shaped resilient member which is contractively fitted around an outer surface portion of a body of the device, whereby the resilient is stretched to relieve air when the air pressure inside the body exceeds a predetermined level.

SUMMARY OF THE INVENTION

It is an object of preferred embodiments of the present invention to provide a reliable pressure relief device. It is a further object of preferred embodiments of the invention to provide a compact device which causes reduced inertial imbalance of a tire to which the device is mounted, as compared to known devices. It is a further object of preferred embodiments of the invention to provide a pressure relief device which is resistant to wear and tear. It is a still further object of preferred embodiments of the invention to provide a device which allows for a variable threshold pressure level, or various embodiments of which may be manufactured with variable threshold pressures while maintaining low production costs.

The present invention provides pressure relief device for an inflatable tire, comprising:
  a body having a chamber therein;
  an air inlet connectable to an inflation device;
  an air outlet connectable to a valve of a tire;
  a conduit for leading air from the inflation device to the tire during inflation thereof;
  a pin arranged to slide axially in a passageway in the body, the pin extending from the air inlet to the air outlet and being slidable between a first position in which it cannot release a stem of the tire, and a second position, in which it can release the stem;
  a pressure relief mechanism for releasing air from the chamber when the pressure therein exceeds a predetermined level;
wherein said conduit is provided as a passage in the pin.

As the passage is provided in the pin, the device may be mass-produced at low cost, as, for example, separate air conduits are not required.

The pressure-relief mechanism may comprise a spring element arranged in the body, the spring element exerting a closing force on a closure element, so that the closure element opens at the predetermined pressure level. The closure element may include a first part, on which the spring acts, and a second part, which closes and seals a passage to the chamber. The first part is preferably made from a material, which is relatively rigid compared to the material of the second part. The second part is preferably elastomeric, e.g. made from rubber.

The pressure relief mechanism may further comprise a passage connecting the chamber to an exterior environment, the passage being normally closed by the spring-biased closure element, the closure element being arranged such that the pressure in the chamber exerts a force on the closure member. The closure element is preferably longitudinally displaceable in the body, such that it may be lifted off its seat when the pressure in the chamber exceeds the predetermined pressure level.

In one embodiment, the pressure-relief mechanism comprises a compression spring, which extends coaxially with the pin. The pin may conveniently have a smaller diameter than the internal diameter of the spring, so that the pin may extend through the spring. The distortion of the compression spring is may be adjustable to adjust said predetermined pressure level. The possibility of adjustment of the distortion may e.g. be achieved by arranging the spring between two elements, the mutual distance of which may be varied.

The pin is preferably guided in the passageway in the body. In order to axially retain the pin in the body, the pin may have a thickened section, which is accommodated in a section of increased diameter in the passageway.

A resilient sealing member may form a seal between the pin and the passageway, the resilient sealing member being arranged such that it is forced into sealing engagement with the pin and the passage under the action of air pressure in the body. Thus, there is provided a reliable seal, which prevents air from escaping from the chamber to the inlet area of the device.

A bottom portion of the body may define a cavity for receiving a valve of the tire within the body, e.g. centrally within the body, and a top portion of the body may be adapted to be connected to an inflation device, such as a pump or compressor.

In order to protect the conduit through the pin from mechanical damage and dirt, the passage in the pin may comprise a transversely extending inlet section and/or a transversely extending outlet section, which are interconnected by a longitudinally extending main section. The transversely inlet section preferably communicates with an inlet cavity in a top section of the body, and the transversely extending outlet section preferably communicates with the chamber. In one embodiment, the pin is open-ended near its inlet end and protected by a first insert member, in which an inlet port is formed as a transversely or longitudinally extending passage. The transversely extending outlet section may be arranged at a distance from that end portion of the pin, which is intended to engage the stem of the tire during inflation thereof, so that engagement of the relatively weak area surrounding the outlet opening with other parts is prevented. Alternatively, the pin may be open-ended near its outlet end, there being optionally provided a second insert member extending into the open outlet end of the pin, the second insert member having an outer diameter, which is smaller than the inner diameter of the passage in the pin, so that an annular flow channel is formed between the second insert member and the inner wall of the pin. The first and second inserts protect the pin against dirt and dust.

In case the overpressure valve is defect, it may be desirable that the device comprises a failsafe means for ensuring that air may escape out of the device in order to prevent pressure from building up in the device with the risk of exploding the device or the tire which is being inflated. One such failsafe means may e.g. comprise a weakened section in the body, the properties of which are such that it breaks at a pressure which is higher than at least one of said first and second predetermined pressure level. For example, a section of the body's outer wall may have a reduced thickness, so that the wall breaks at a certain pressure.

A bottom portion of the body preferably defines a cavity for receiving a valve of the tire within the body, the cavity most preferably defining a threaded portion for screwing the device onto a threaded portion of a tire valve. A top portion of the body may be adapted to connect the inflation valve in the body to an inflation device, such as an air inflation nozzle. In order to ensure a short longitudinal extent of the device, the air conduit is preferably arranged radially displaced with respect to the cavity near the bottom portion.

In order to notify a user when the predetermined threshold pressure level has been reached or exceeded during inflation of the tire, there may be provided means for emitting an acoustic signal or means for emitting an optical signal when the air pressure in the chamber has reached or exceeds the predetermined pressure level. In one embodiment, the acoustic signal is generated as a whistling tone generated by excess air flowing past out of the device. Once the excess air has escaped, the flow of excess air stops, and the whistling tone will stop. Alternatively, there may be provided electronic means, e.g. in the form of an electronic pressure sensor coupled to a light-emitting means or an electronically controlled sound source.

The invention further provides a kit comprising a plurality of pressure relief devices, wherein the devices define different predetermined pressure levels. Preferably, each device in the kit is easily identifiable by a user, so that each individual device in the kit may be associated with a particular pressure level. For example, the predetermined threshold pressure level of each device of the kit may be indicated on a visible surface of the device.

In a further aspect there is provided a combination of a pressure relief device as disclosed herein and an inflatable tire. The pressure relief device may be permanently integrated with the tire, for example with a stem of the tire, e.g. to form one integrated unit, or it may be releasably attached to the stem of the tire. The invention also provides a rim for an inflatable tire, the rim comprising a pressure relief device according to the invention, the pressure relief device being optionally integrated a valve for inflation of the tire. Further, the invention provides a wheel comprising such a rim and an inflatable tire.

DESCRIPTION OF THE DRAWINGS

Embodiment of a pressure relief device according to the invention will now be described with reference to the accompanying drawings, in which.

Figure 1:
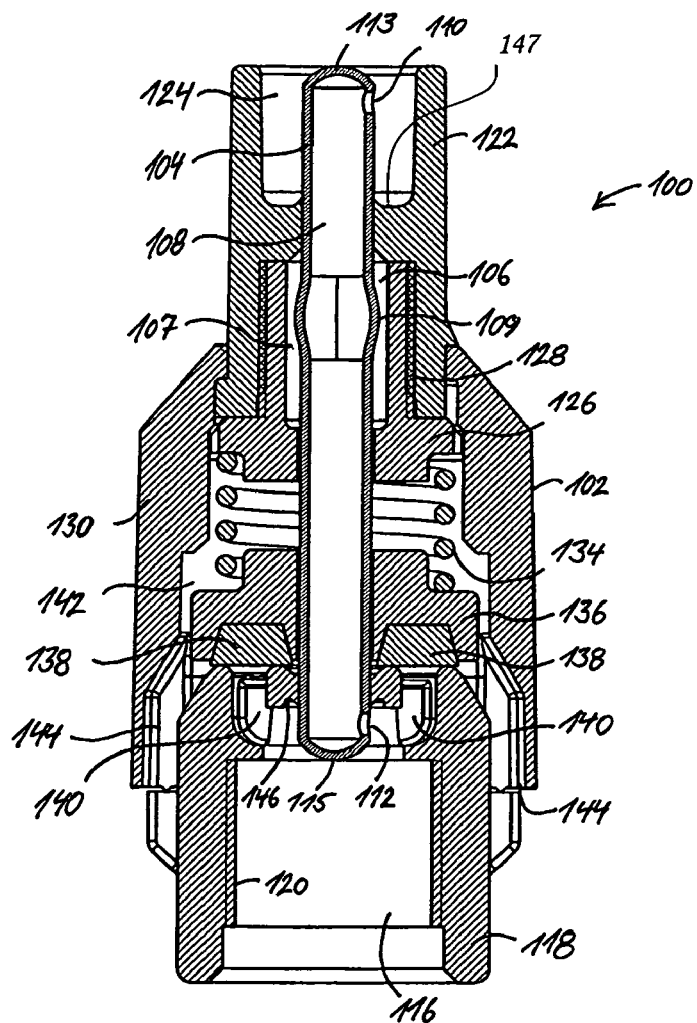
FIGS. 1 and 2 illustrate a first embodiment.

The pressure relief device 100 a body 102, and a pin 104 for releasing a stem of a tire valve (not shown). The pin 104 is slidingly mounted in a passageway 106 in the body. A bottom portion of the body defines a chamber 116 for receiving a valve of a tire (not shown) centrally within the body. An insertion element 118 is fitted into the bottom portion of the body. The insertion element defines a threaded portion 120 for attaching the pressure relief device to the tire valve. The pin 104 defines a longitudinally extending air conduit passage 108, rounded end portions 113 and 115, as well as transversely extending inlet 110 and transversely extending outlet 112. The pin 104 is longitudinally slidable in the passageway 106, increased-diameter section 107 of which accommodates a thickened section 109 of the pin 104. The upper and lower extremities of the increased-diameter section 107 define the maximum stroke of the pin 104.

The body 102 comprises an upper portion 122 with an inlet area 124 in the form of a cavity for receiving an inflation device, such as a pump or compressor. The body further comprises an inner intermediate section 126, which is screwed into the upper portion 122 by means of threads 128. The intermediate section 126 defines the increased-diameter section 107. Further, the body comprises an outer section 130 as well as insertion element 118 as described above.

Within the body there is provided a pressure relief mechanism including a compression spring 134, one end of which rests against the intermediate section 126, and another end of which acts on a closure element 136. The closure element holds a ring-shaped elastomeric closure member 138, which, in the closed configuration shown in FIG. 1, keeps flow passages 140 closed. Alternatively, four elastomeric closure members 138 are provided. A cavity or chamber 142 is defined between the outer section 130 and the closure element 136, the cavity 142 communicating with the exterior environment via passages 144. A sealing member 146 provides a seal between the pin and the passageway in the body to prevent unintentional air leakage along an outer surface of the pin. The sealing member 146 is arranged such that air pressure in the chamber 116 forces it into sealing engagement with the pin. The upper portion of the body may form a sealing portion 147, e.g. at the bottom of section of inlet area 124, the sealing portion 147 being preferably arranged such that the inlet pressure in the inlet area 124 forces it into sealing engagement with the pin. As an alternative to the sealing portion, a separate sealing member (not shown) may be provided.

The pressure relief device is operated as follows: the device is screwed onto an outer surface portion of a tire valve by means of the threaded portion 120 of the insertion element 118, the tire valve being thereby received in the chamber 116. An inflation device, such as an air hose nozzle, which is connected to a pressurized source, is then attached to the upper portion 122 of the body 102, with a stem of the inflation device (not shown) contacting the upper surface 113 of the pin 104. The pin 104 is thereby pressed downwards until the lower end surface 115 of the pin 104 contacts the upper end of the valve stem (not shown) associated with the tire to thereby open the tire valve. Air flows from the pressurized source to the interior of the tire via the passage 108 in the pin 104. The air pressure in the chamber 116 and the flow passages 140 is thus essentially equal to the tire pressure. The pressure in the air conduit and the flow passages 140 exerts a force on the closure members 138. When the pressure in the flow passages 140 and thus in the tire reaches a certain threshold level, the force acting upwardly on the closure members 138 is sufficient to overcome the downwardly acting force of the compression spring 134. Thus, air may escape to the exterior environment via flow passages 140, cavity 142 and passages 144.

The threshold pressure level is determined by the properties of the compression spring 134, the surface area of the closure members 138, and the distortion of the compression spring 134. The distortion of the compression spring may be varied by displacement (rotation) of the upper portion 122.

Figure 2:
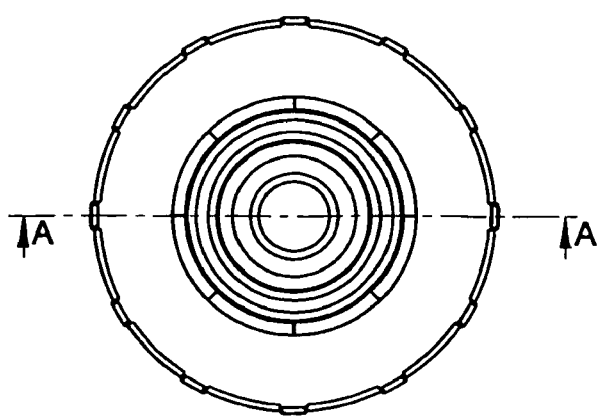
Figure 3:
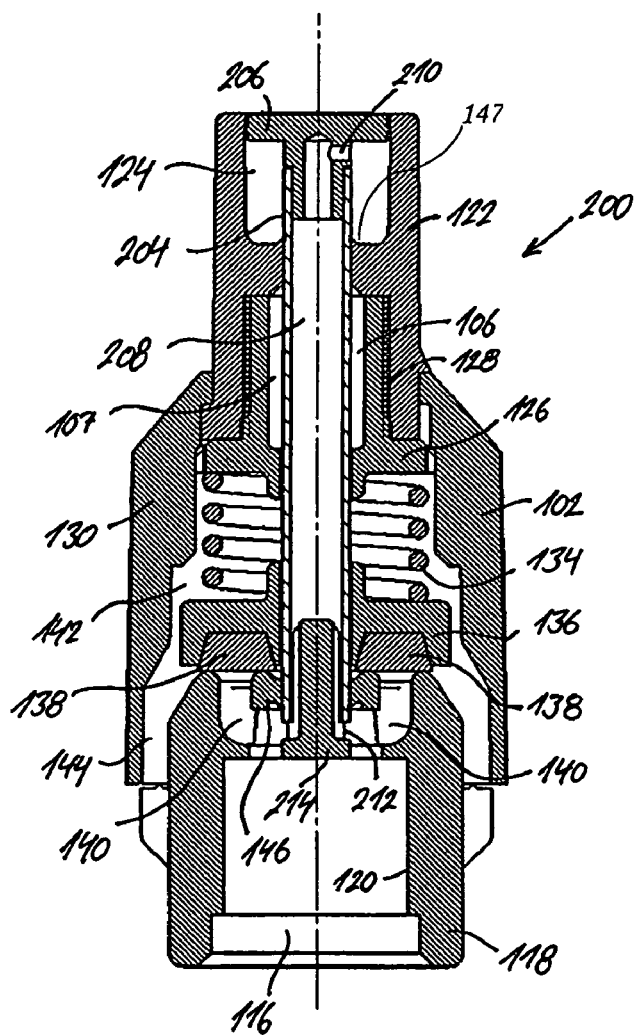
FIGS. 3 and 4 illustrate a second embodiment.
Figure 4:
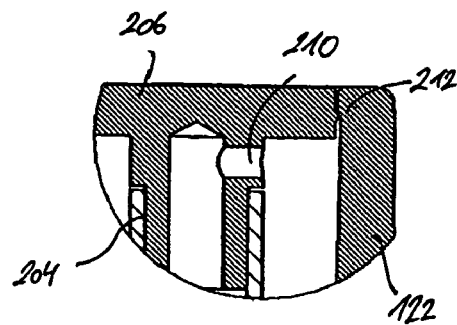
Figure 5:
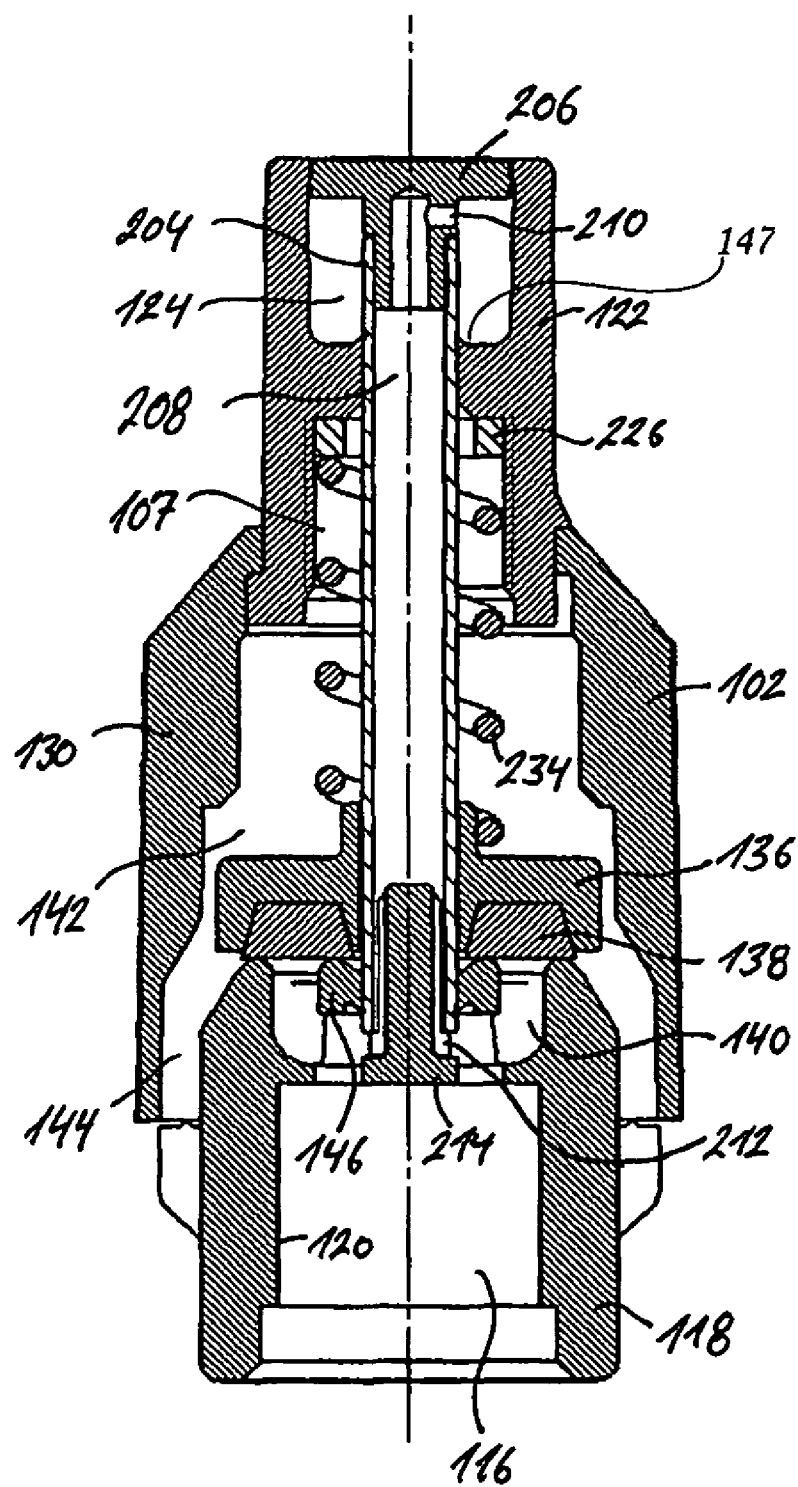
FIG. 5 illustrates a third embodiment.

FIGS. 3 and 4 illustrate a second embodiment of a pressure relief device according to the present invention, and FIG. 5 illustrates a third embodiment. Below, only the differences between the embodiments of FIGS. 1 and 2 on the one hand, and FIGS. 3-5 on the other will be discussed. To the extent that identical elements or elements performing identical functions are present in the embodiments of FIGS. 3-5, such elements are identified by the same reference numerals as in FIGS. 1 and 2. It will hence be understood that the description of such elements included above in relation to FIGS. 1 and 2 also applies to the below description of FIGS. 3-5. The device of FIGS. 3-5 operates in a similar manner as the device of FIGS. 1 and 2.

In the embodiment of FIGS. 3-5, the pin 204 is provided in the form of an open-ended tubular pipe. A first insert member 206 is provided in the inlet area 124 for closing the open end of the pin 204. As shown in the detail of FIG. 4, the first insert member 206 closes circumferentially towards an inner wall of the upper body portion 122 at 212. A transversely extending inlet port 210 is provided in the first insert member 206. At the opposite, outlet end of the pin 204, a second insert member 214 is provided, the second insert member 214 having a smaller outer diameter than the inner diameter of the pin 204, so that an annular flow outlet passage 212 is provided.

In the embodiment of FIG. 5, the intermediate section 126 present in the embodiment of FIGS. 1-4 has been omitted. A ring element 226 is optionally provided, the height of the ring element 226 determining the distortion of the spring 234 and hence the relief threshold pressure of the device.

The outer section 130 of the body 102 and the upper body portion 122 may be formed as one single element.

The invention claimed is:

1. A pressure relief device for an inflatable tire, comprising: a body defining a chamber therein; an air inlet configured to connect to an inflation device; an air outlet configured to connect to a valve of a tire; a pin configured to slide axially in a passageway in the body, the pin extending from the air inlet to the air outlet and being slidable between a first position in which the pin cannot release a stem of the tire, and a second position, in which the pin can release the stem, the pin defining a conduit configured to lead air from the inflation device to the valve of the tire during inflation thereof, the conduit providing a passage in the pin, the passage in the pin comprising a transversely extending inlet section and a transversely extending outlet section; a pressure relief mechanism for releasing air from the chamber when the pressure therein exceeds a threshold pressure level.

2. A device according to claim 1, wherein the pressure-relief mechanism comprises a spring element arranged in the body, the spring element exerting a closing force on a closure element, so that the closure element opens at said threshold pressure level.

3. A device according to claim 2, wherein the pressure relief mechanism comprises a relief passage connecting the chamber to an exterior environment, the relief passage being normally closed by the closure element, the closure element being arranged such that the pressure in the chamber exerts a force on the closure element to open the relief passage when the force derived from the pressure in the chamber exceeds a counteracting closing force of the pressure-relief mechanism.

4. A device according to claim 3, wherein the pressure-relief mechanism comprises a spring element, which extends coaxially with the pin.

5. A device according to claim 4, wherein the distortion of the spring element is adjustable to adjust said threshold pressure level.

6. A device according to claim 1, wherein the pin is guided in the passageway in the body, the pin having a thickened section, which is accommodated in a section of increased diameter in the passageway, whereby the thickened section and the increased diameter section provide an axial retainment of the pin in the body.

7. A device according to claim 1, wherein the pin is guided in the passageway in the body, and wherein at least one resilient sealing member forms a seal between the pin and the passageway, the resilient sealing member being arranged such that it is forced into sealing engagement with the pin and the passage under the action of air pressure in the body.

8. A device according to claim 1, wherein the transversely extending outlet section communicates with said chamber.

9. A device according to claim 1, wherein the transversely extending outlet section is arranged at a distance from an end portion of the pin, the end portion configured to engage the stem of the tire during inflation thereof.

10. An inflatable tire comprising a pressure relief device according to claim 1.

* * * * *